(No Model.)
J. C. SCHUMAN.
MANUFACTURE OF STARCH.
No. 341,283. Patented May 4, 1886.
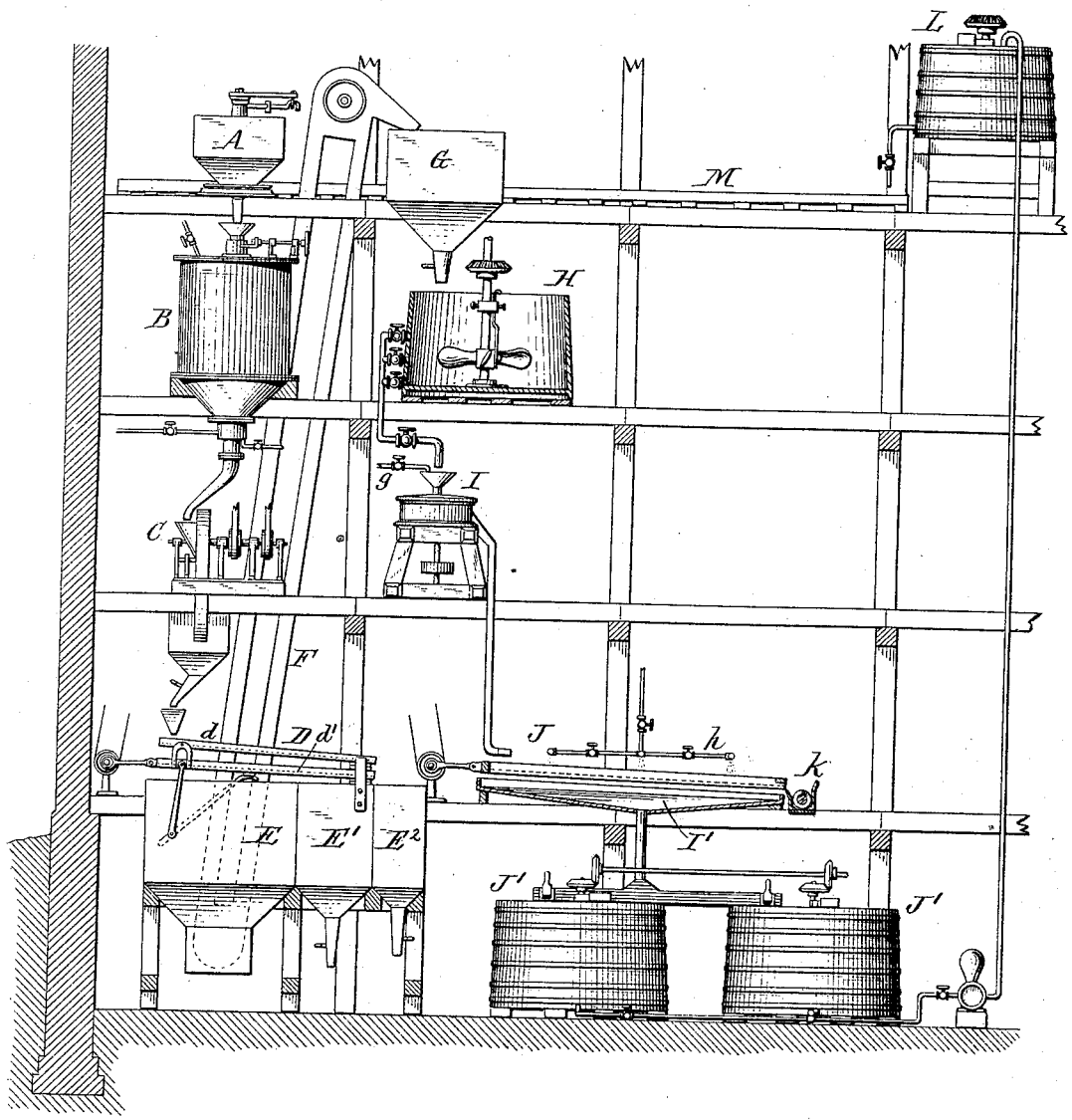

UNITED STATES PATENT OFFICE.

JOHN C. SCHUMAN, OF AKRON, ASSIGNOR TO WILLIAM T. JEBB, OF BUFFALO, NEW YORK.

MANUFACTURE OF STARCH.

SPECIFICATION forming part of Letters Patent No. 341,283, dated May 4, 1886.

Application filed January 21, 1886. Serial No. 189,261. (No model.)

*To all whom it may concern:*

Be it known that I, JOHN C. SCHUMAN, of Akron, in the county of Erie and State of New York, have invented a new and useful Improvement in the Manufacture of Starch, of which the following is a specification.

This invention relates to an improvement in that method of extracting starch from grain, more especially Indian corn or maize, which consists in first detaching and separating the crude starch-meal from the bran or offal, and then regrinding the separated starch-meal and treating the same further, as may be required, for producing the desired ultimate product, whether commercial starch, grape-sugar, or other products. A method of this general character is described in Letters Patent of the United States No. 318,308, granted to me May 19, 1885.

The object of the present invention is to better prepare the separated crude starch-meal for the second reducing or the regrinding operation, and to facilitate the subsequent treatment; and the invention consists to that end in steeping the separated starch-meal preparatory to regrinding the same, as will be hereinafter fully set forth, and pointed out in the claims.

The accompanying drawing represents a plant of machinery by which my invention can be practiced.

A represents a weigh-hopper or charger, which receives the Indian corn or maize, and from which the grain passes to the steep-tank B, in which the corn is steeped sufficiently to permit the hulls and germs to be detached from the starchy portions of the kernels by the subsequent treatment. This steeping is preferably effected by supplying the steep-tank with water having a temperature of about 140° Fahrenheit, and renewing the steep-water from time to time until the corn has reached the desired degree of softness.

While I prefer to conduct this preliminary steeping operation in the aforesaid manner, it may be modified, as the condition of the grain may require and the judgment of the operator may deem expedient.

C represents a reducing-machine, which receives the steeped corn, and in which the corn is reduced in such manner that the starchy portions of the kernels or starch-meal can be separated from the hulls and germs or coarse offal by the subsequent sifting operation. I prefer for this purpose a machine which consists of several concentric rows of beaters revolving at a high speed in opposite directions within an inclosing-case, and whereby the grain is whipped or beaten. By the operation of this machine the hulls and their glutinous linings are opened and stripped or detached in large flakes from the inner starchy bodies of the kernels and from the germs, the starchy bodies being at the same time reduced to a meal and the germs either left unbroken or reduced to coarse fragments, so that the starch-meal can be easily separated from the germs and hulls by sifting.

While I prefer to employ a whipping or beating machine for this primary reduction, any other suitable reducing-machine may be employed for this purpose—for instance, a disk-mill in which one of the disks has an eccentric movement with reference to the other, or a roller-mill; but none of these effects the desired reduction so completely and advantageously as the beating or whipping machine first mentioned.

D represents a screen-separator, whereby the starch-meal is separated from the fragments of hulls and germs, the starch-meal passing to a receiver, E, the germs to a receiver, E', and the hulls to a receiver, E². The separator which I prefer to employ for this purpose consists of an upper coarse screen, $d$, and a lower fine screen, $d'$, as described and shown in Letters Patent of the United States, No. 334,090, granted to me January 12, 1886. The starch-meal passes through the coarse screen $d$ and the finely-clothed head portion of the lower fine screen, $d'$, into the receiver E. The germs pass through the upper screen, $d$, and the coarsely-clothed tail portion of the lower screen, $d'$, into the receiver E', and the fragments of hulls tail off from both screens $d$ $d'$ into the receiver E².

Any other suitable separator by which the starch-meal is separated from the coarse offal may be employed, if desired.

F represents an elevator, whereby the separated starch-meal is elevated from the receiver E to a receiver, G, in the upper part of the building.

H represents a steep-vat, which receives the starch-meal from the receiver G, and in which the starch-meal is steeped for a sufficient length of time to facilitate the separation of the starch-particles from the offal by the subsequent treatment. The temperature of the steep-water and the duration of the period of steeping may be varied in accordance with the conditions of each case and as the judgment of the operator may deem expedient. The steep-vat is preferably provided with an agitator for thoroughly mixing the steep-water with the starch-meal.

I represents a mill, which receives the steeped starch-meal, and in which the starch-meal is reground, preferably with additional water, which is supplied to the mill by a pipe, $g$. I prefer for this purpose a burr or disk mill, such as is usually employed for the reduction of corn in the manufacture of starch by the wet process; but any other suitable reduction-machine may be employed for the purpose. The steeped starch-meal is reduced in this mill to a high degree of fineness, and any impurities—such as fine fragments of hulls, gluten, or germs which may have adhered to the starchy fragments—are completely detached from the same, and the starch is thoroughly mixed with the water, forming a starch-milk of uniform density.

J represents a separator, which receives the starch-milk from the mill I, and by which the coarser impurities are separated from the starch-milk. I prefer to employ for this purpose a separating-sieve, which is covered with bolting-cloth of the proper mesh to permit the starch-milk to pass through, while the impurities tail off. This separation is facilitated by sprays of water which are delivered upon the screen from perforated pipes $h$. The starch-milk is collected in a gutter or trough, I', underneath the sieve, and conducted to the settling-vats J', while the offal is collected in a trough, $k$, and removed to a suitable receptacle. If desired, the starch-milk may be passed from the mill I into a vat similar to the steep-vat H, arranged between the mill I and the separator J, in which vat the starch-milk is further agitated, in order to reduce the liquid to a uniform gravity before it passes to the separator J. The starch-milk so obtained may now be treated in any suitable or well-known manner, as may be necessary to obtain the desired ultimate product. For instance, when it is desired to obtain starch suitable for the manufacture of commercial starch or for conversion into grape-sugar or glucose, the starch may be permitted to settle in the vats J', from which the water is drawn off from above the deposited starch. Fresh water is then mixed with the deposited starch and a solution of caustic alkali added, in the proportion of about one-eighth of a pound of alkali to the product from one bushel of grain, the alkaline solution weighing about $2\frac{1}{2}°$ Baumé. This alkaline solution is thoroughly mixed with the starch-milk by the agitators with which the vats J' are provided, and water is added until the gravity of the mixture is reduced to about 3° Baumé. The liquid is next pumped to a receiving-tank, L, and passed from the latter to inclined tables or runs M, upon which the starch is deposited, while the refuse runs off; or the starch may be deposited out of the liquid in vats or tanks. If preferred, the product obtained from the mill I may be conducted directly into the settling-vats J', omitting the second sifting operation above described. In these vats the starchy liquid is allowed to settle; the water is then drawn off, additional water is added sufficient to reduce the settled mass to a liquid by agitation, and a weak solution of alkali may be mixed with the starchy liquid. Water is again added until the starchy liquid is reduced to about 3° Baumé, and the liquid is then run upon inclined planes or the starch settled in vats. The deposited starch may then be removed and, if desired, washed to remove all remaining traces of alkali or other impurities until a product of the desired purity is obtained.

If desired, the starch may be deposited out of the starch-milk on tables or in settling vats or tanks without adding alkali, and the starch so obtained may be converted into grape-sugar or glucose in any suitable manner.

The operation of obtaining the starch from the starch-milk may be modified in many ways, as the judgment of the operator and the character of the desired ultimate product may render advisable.

The hulls and germs which are separated from the starch-meal may be subjected to a second reducing operation, similar to the first, whereby the starch-particles which may adhere to the hulls and germs are detached therefrom, and these starch-particles may be recovered by a suitable sifting operation and added to the starch-meal before the latter is steeped.

In this method of extracting starch from grain the hulls and germs are separated from the crude starch or starch-meal by the primary reducing and sifting operations. The grain is prepared for this separation of its constituent parts by the primary steeping operation, the period of which is made comparatively short and just sufficient to prepare the grain for the detachment of the hulls and germs from the starchy bodies of the kernels. By thus reducing the period of the first steeping operation the liability of the grain to sour is considerably reduced. The hulls and germs are separated from the crude starch in a comparatively dry state, and as they are not contaminated with alkali they can be utilized advantageously as cattle-feed and for other purposes. By steeping the separated starch-meal before grinding the same, the starchy fragments are more thoroughly permeated by the steep-water, and consequently more completely opened or loosened than could be accomplished by steeping the whole grain or the reduced grain before the offal is separated therefrom, and this result is accomplished in less time than by the ordinary methods. This steeping of the starch-meal therefore reaches all parts of the starchy material, and greatly facilitates the separation of the remaining impurities therefrom and the further reduction of the starch-meal, which is necessary for the formation of a starch-milk suitable for the production of starch of great purity, and of a large yield of starch. The period during which the starch-meal is steeped may be somewhat extended, if deemed advisable, without detriment to the quality of the starch, as the bulk of the ingredients of the kernels which are liable to turn sour during steeping has been removed by the first separation.

It is obvious that the apparatus can be modified to suit the requirements of the ultimate product which it is desired to manufacture, and as may be required to adapt the apparatus to the building in which it is placed.

I claim as my invention—

1. The herein-described method of extracting starch from grain, which consists in first detaching and separating the starch-meal from the coarse offal, then steeping the separated starch-meal, then grinding the steeped starch-meal, and then separating the remaining impurities from the starch, substantially as set forth.

2. The herein-described method of extracting starch from grain, which consists in first steeping the grain, then reducing the grain, then separating the starch-meal from the coarse offal, then steeping the separated starch-meal, then grinding the steeped starch-meal, and then separating the remaining impurities from the starch, substantially as set forth.

3. The herein-described method of extracting starch from grain, which consists in first detaching the hulls and germs from the starchy portions by whipping or beating, then separating the starch-meal from the hulls and germs, then steeping the separated starch-meal, then grinding the steeped starch-meal, and then separating the remaining impurities from the starch, substantially as set forth.

4. The herein-described method of extracting starch from grain, which consists in first steeping the grain, then detaching the hulls and germs from the starchy portions by whipping or beating, then separating the starch-meal from the hulls and germs, then steeping the separated starch-meal, then grinding the steeped starch-meal, and then separating the remaining impurities from the starch, substantially as set forth.

Witness my hand this 18th day of January, 1886.

JOHN C. SCHUMAN.

Witnesses:
EDWARD WILHELM,
OSCAR SCHAUB.